United States Patent
Butler

(10) Patent No.: US 11,739,013 B2
(45) Date of Patent: Aug. 29, 2023

(54) APPARATUS FOR INTRODUCING AN AGENT INTO A LIQUID OR GAS AT A CONTROLLED RATE

(71) Applicant: Northern Water Cleaners, Moose Jaw (CA)

(72) Inventor: Ernie Butler, Moose Jaw (CA)

(73) Assignee: Northern Water Cleaners, Moose Jaw (CA)

( * ) Notice: Subject to any disclaimer, the term of this patent is extended or adjusted under 35 U.S.C. 154(b) by 87 days.

(21) Appl. No.: 16/850,870

(22) Filed: Apr. 16, 2020

(65) Prior Publication Data

US 2020/0331779 A1    Oct. 22, 2020

Related U.S. Application Data

(60) Provisional application No. 62/835,851, filed on Apr. 18, 2019.

(51) Int. Cl.
*C02F 1/68* (2023.01)
*B65D 83/26* (2006.01)

(52) U.S. Cl.
CPC ............ *C02F 1/686* (2013.01); *B65D 83/265* (2013.01)

(58) Field of Classification Search
CPC .. C02F 1/686; C02F 1/68; C02F 1/766; C02F 1/688; C02F 1/283; C02F 1/444; C02F 9/00; C02F 2303/04; C02F 2303/185; B01D 35/02; B01D 61/14; B65D 83/265; B65D 83/26; B01J 4/02; C08J 2371/10; C08J 2377/02; C08J 2425/06; C08J 2471/10; C08J 2477/02; C08J 5/04; C08J 5/042; C08J 5/06; C08J 2371/12; C08J 2471/12; C08J 2477/06; C08K 7/02; C08K 7/06; C08L 71/12; C08L 77/00
USPC .... 210/206, 202, 266, 284, 198.1, 205, 753, 210/282, 201, 203, 259
See application file for complete search history.

(56) References Cited

U.S. PATENT DOCUMENTS 5,525,223 A * 6/1996 Butler ........................ A61L 2/18
210/202

\* cited by examiner

*Primary Examiner* — Akash K Varma
(74) *Attorney, Agent, or Firm* — Laurie Wright; Christopher N. Hunter; Blake, Cassels & Graydon LLP

(57) ABSTRACT

The present invention provides an agent dispenser for use in introducing an agent into a fluid where the agent is miscible with such fluid. The agent dispenser comprises a hollow casing constructed of a material having a coefficient of cubical expansion that differs from the coefficient of cubical expansion of the fluid. At least one opening is provided in the hollow casing for permitting the flow of the fluid to and from the interior of the hollow casing. The opening is provided with a tube sealed in the opening, one end of the tube being contained within the hollow casing and the second end of the tube being exterior to the hollow casing for communication with the surrounding fluid. The second end of the tube is provided with a filter membrane having a defined pore size to prevent any debris which may be present in the fluid from blocking the second end or entering the hollow casing. The dispenser contains the agent and the agent is introduced into the fluid through fluid drawn into and expelled from said dispenser as a result of variations in the internal pressure of the dispenser resulting from thermal expansion and contraction of the dispenser and its contents caused by variations in the temperature of the fluid surrounding the dispenser.

16 Claims, 3 Drawing Sheets

APPARATUS FOR INTRODUCING AN AGENT INTO A LIQUID OR GAS AT A CONTROLLED RATE

CROSS-REFERENCE TO RELATED APPLICATIONS

This application claims priority to U.S. Provisional Application No. 62/835,851 filed on Apr. 18, 2019 incorporated herein by reference in its entirety.

FIELD OF THE INVENTION

The present invention relates to an agent dispenser, a method and an apparatus for introducing an agent into a fluid at a controlled rate, and more particularly to an agent dispenser, a method and an apparatus that relies upon temperature fluctuations in the fluid to control the rate of introduction of the agent into the fluid.

BACKGROUND OF THE INVENTION

Means for introducing agents into a surrounding fluid are known. For instance, spray canisters connected to electric timers may be used to eject a scented gas or insect repellant into the air of a room at regular intervals. Also, perforated containers filled with chlorine crystals or tablets may be placed in the water of swimming pools to allow chlorine to seep into the surrounding water by the action of water passing through the perforated container.

In instances where it is desirable to introduce an agent into a gas or liquid, it is often also desirable to control the amount of agent being introduced. However, in systems where the gas or liquid is flowing at random intervals, it can be especially difficult to control the degree to which an agent is introduced into the system. In such cases, it is desirable to have a system capable of responding to the random flow of the gas or liquid.

One particular use for such a system lies in the field of water treatment. One of the problems associated with the treatment of domestic or institutional water systems is the relatively intermittent nature of the flow of water in such systems and the resultant bacterial buildup that can occur. In domestic or institutional water systems, bodies of water are stored in containers or tanks where the water may be drawn off from time to time. Makeup water is added to the container or tank when an equal amount of water is drawn off. Often the water that is drawn off must first pass through a filter element. Typically, such filter elements are immersed in the container or tank itself. The containers or tanks are normally located in the interior of a building where the temperature will normally be at room temperature in the region of 20° to 22° C. At these temperatures, and with the water essentially motionless for varying lengths of time, bacteria within the water tend to settle on the filter and grow relatively actively. This can lead to rapid contamination of the filter and create health risks.

My earlier patent, U.S. Pat. No. 5,525,223 described a system to treat the water standing in the container or tank with iodine following each time a fresh flow of water enters the system. When the iodine-treated water passes through the filter, the iodine remains on the filter and kills any bacteria that may exist. The system included an agent dispenser for use in introducing an agent such as iodine into a fluid where the agent is miscible with the fluid. The agent dispenser had a hollow casing constructed of a material having a coefficient of cubical expansion that differs from the coefficient of cubical expansion of the fluid. An opening was provided in the hollow casing for permitting the flow of the fluid to and from the interior of the hollow casing. The dispenser contains the agent and the agent is introduced into the fluid through fluid drawn into and expelled from the dispenser as a result of variations in the internal pressure of the dispenser resulting from thermal expansion and contraction of the dispenser and its contents caused by variations in the temperature of the fluid surrounding the dispenser.

While the agent dispenser described in my previous patent was effective, it was found that in conditions where the incoming fluid had significant amounts of debris, there was a tendency for the agent dispenser to become clogged by debris, reducing its efficiency.

There thus remains a need for an agent dispenser which overcomes the above problems.

SUMMARY OF THE INVENTION

The present invention provides an agent dispenser for use in introducing an agent into a fluid where the agent is miscible with such fluid. The agent dispenser comprises a hollow casing constructed of a material having a coefficient of cubical expansion that differs from the coefficient of cubical expansion of the fluid. At least one opening is provided in the hollow casing for permitting the flow of the fluid to and from the interior of the hollow casing. The opening is provided with a tube sealed in the opening, one end of the tube being contained within the hollow casing and the second end of the tube being exterior to the hollow casing for communication with the surrounding fluid. The second end of the tube is provided with a filter membrane having a defined pore size to prevent any debris which may be present in the fluid from blocking the second end or entering the hollow casing. The dispenser contains the agent and the agent is introduced into the fluid through fluid drawn into and expelled from said dispenser as a result of variations in the internal pressure of the dispenser resulting from thermal expansion and contraction of the dispenser and its contents caused by variations in the temperature of the fluid surrounding the dispenser.

The present invention further provides a method for introducing an agent into a fluid supply at a controlled rate, where the agent is miscible with such fluid. The method comprises the following steps: (a) placing at least one agent dispenser, as described above, into a reservoir, (b) introducing the fluid into the reservoir, and (c) intermittently discharging the fluid from the reservoir and reintroducing new fluid to the reservoir. As described above, the agent is introduced into the fluid in the reservoir through the entry and expulsion of fluid into and from the dispenser, which is driven by variations in the internal pressure of the dispenser resulting from thermal expansion and contraction of the dispenser and its contents due to variations in temperature of the fluid in the reservoir.

The present invention further provides an apparatus for introducing an agent into a fluid at controlled rate, where the agent is miscible with such fluid. The apparatus comprises a reservoir for storing the fluid, inlet means for supplying the fluid to the reservoir, outlet means for discharging the fluid from the reservoir, and at least one agent dispenser as described above located in the reservoir.

In one application for the invention, the avoidance of contamination of water filters, one aspect of the invention provides a method and apparatus for introducing iodine into water at a controlled rate. When the iodine-treated water passes through the filter, the iodine remains on the filter and kills any bacteria that may exist. The thermal expansion of the dispenser and its contents is due to changes in temperature caused by flow of the main supply of water.

When the water is not flowing, the temperature of the water contained within the dispenser is generally equal to the temperature of the surrounding water in the reservoir, both being at a resting or room temperature. The water resident within the dispenser will become saturated with the agent.

When water is drawn from the reservoir, the primary supply of water begins to flow to the reservoir. The invention contemplates a temperature differential between incoming water and water remaining in the reservoir. In a preferred embodiment, the incoming water would be significantly warmer or cooler than the normal resting or room temperature of water in the reservoir. As the temperature of the surrounding water within the reservoir changes due to the warmer or cooler incoming supply, the volume of the water and the volume of the dispenser will also change following the laws of thermodynamics.

If the incoming supply of water is cooler, the dispenser and its contents will gradually cool, and the volume of the water within the dispenser will gradually decrease as will the volume of the dispenser. Since the dispenser is constructed of a material having a coefficient of cubical expansion larger or smaller than the coefficient of cubical expansion of the fluid, the rate of contraction of each will differ. In the case of a crystalline polystyrene dispenser placed in a chamber of water subjected to an incoming flow of cooler water, the water will constrict at a rate approximately ten times faster than the polystyrene dispenser. Thus, the internal pressure of the dispenser will be lower than the pressure exerted by the surrounding water. Consequently, water will be drawn into the dispenser through the opening where it may become saturated with the iodine. When the water flow to the reservoir is stopped and the water within the reservoir gradually returns to the higher resting or room temperature, the iodine-saturated water within the dispenser as well as the dispenser itself will gradually return to a resting temperature and will expand. Since the water expands at a rate faster than the dispenser, there will be a higher pressure within the dispenser than in the surrounding water. Consequently, some iodine-saturated water will be expelled through the opening of the dispenser and introduced into the surrounding water in the reservoir.

The system will similarly work, in the reverse order, when the temperature of the water supply fed to the treatment chamber is higher than the resting temperature for the treatment chamber, or when the coefficient of cubical expansion of the water is less than the coefficient of cubical expansion of the dispenser material.

To ensure saturation of the water contained within the dispenser with the agent before the water is ejected back into the surrounding supply, it is desirable to control the residence time (Rt) of the water within the dispenser.

The residence time is affected by the rate at which the dispenser and its contents expands or contracts. This in turn depends upon the coefficient of cubical expansion of the dispenser material and the coefficient of cubical expansion of the water. As well, the rate of expansion or contraction is affected by the rate at which the water is allowed to flow into or out of the dispenser. By adjusting the size of the tube sealed in the dispenser opening, a slower or faster flow rate may be achieved. (Note that the tube and dispenser opening will also expand and contract with changes in temperature.)

For larger containers, it may be advantageous to use a number of dispensers, and/or to use iodine of enhanced solubility.

The agent dispenser of the present invention can also be housed in a treatment chamber that is connected to the main fluid flow, and to the reservoir. For example, in the water reservoir/filter application, the treatment chamber would receive part of the new water fed to the reservoir, and its contents would be drawn to and through the reservoir when water is drawn from the reservoir.

The present invention can be used in any situation where agents are to be added to fluids and temperature differences can be brought to bear upon the dispenser as described. For example, it would also be used to impart vitamins or minerals to water, etc.

BRIEF DESCRIPTION OF THE DRAWINGS

The invention will now be described merely by way of illustration with reference to the accompanying drawings in which.

DESCRIPTION OF A PREFERRED EMBODIMENT

The agent dispenser when used on its own, or when used with the apparatus or method as claimed in the present invention, has a broad range of uses for introducing agents into a fluid. It may be utilized in situations where temperature changes exist or can be created in a fluid to selectively drive the release of the agent from the dispenser into such fluid.

The agent dispenser of the present invention is an improvement on the agent dispenser disclosed in my earlier patent, U.S. Pat. No. 5,525,223, the disclosure of which is incorporated herein by reference. My earlier patent describes the principles of operation of the agent dispenser and various apparatus which can utilize the agent dispenser of the present invention. Such applications of the use of the agent dispenser of the present invention would be immediately apparent to those of skill in the art based upon the teaching of my pervious patent. All such applications are encompassed within the scope of the present invention.

The preferred embodiment of the present invention will be described based upon an agent dispenser for adding iodine to water and an apparatus and method for such treatment. A primary example of the use of this dispenser and the method of use is the aforementioned water filtration system in which the filter rests in tepid water. In this environment, bacteria tend to settle on the filter and grow relatively actively. This can lead to contamination of the very water that is being filtered. By introducing iodine into the water in which the filter rests, the bacteria growth may be reduced and even stopped. The purpose of the method and apparatus described below is to ensure that iodine is introduced into the system each time filtered water is drawn off and unfiltered water is added. The iodine will be captured by the filter prior to the discharge of filtered water.

While the preferred embodiment is described with respect to an agent dispenser for introducing iodine into a water supply, it will be appreciated by those of skill in the art that the agent dispenser may be easily adapted to introduce any agent into any fluid in situations where temperature changes exist or can be created in a fluid to selectively drive the release of the agent from the dispenser into such fluid.

Agent Dispenser

Figure 1:
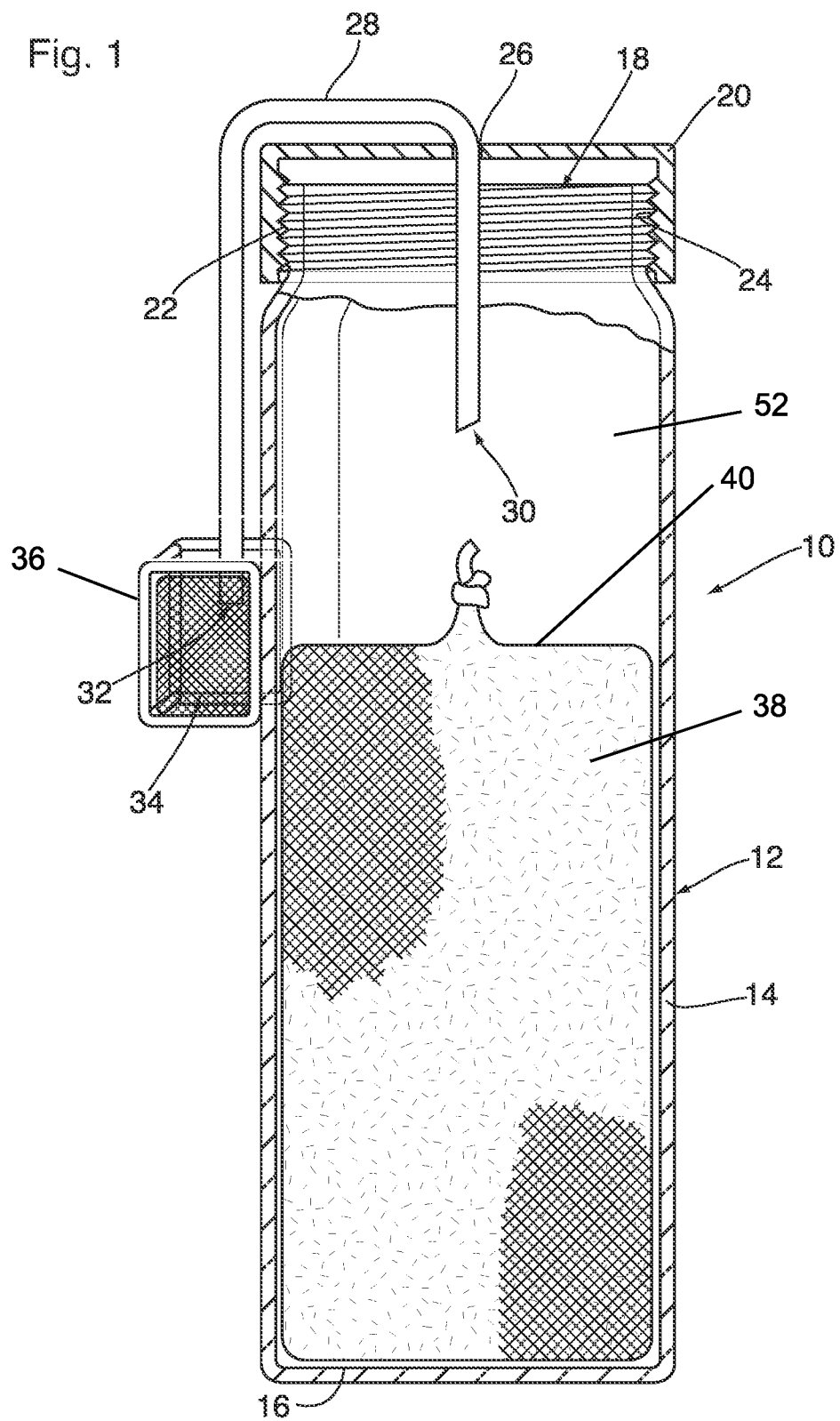
FIG. 1 is a sectional view through one embodiment of an agent dispenser in accordance with the present invention.
Figure 2:
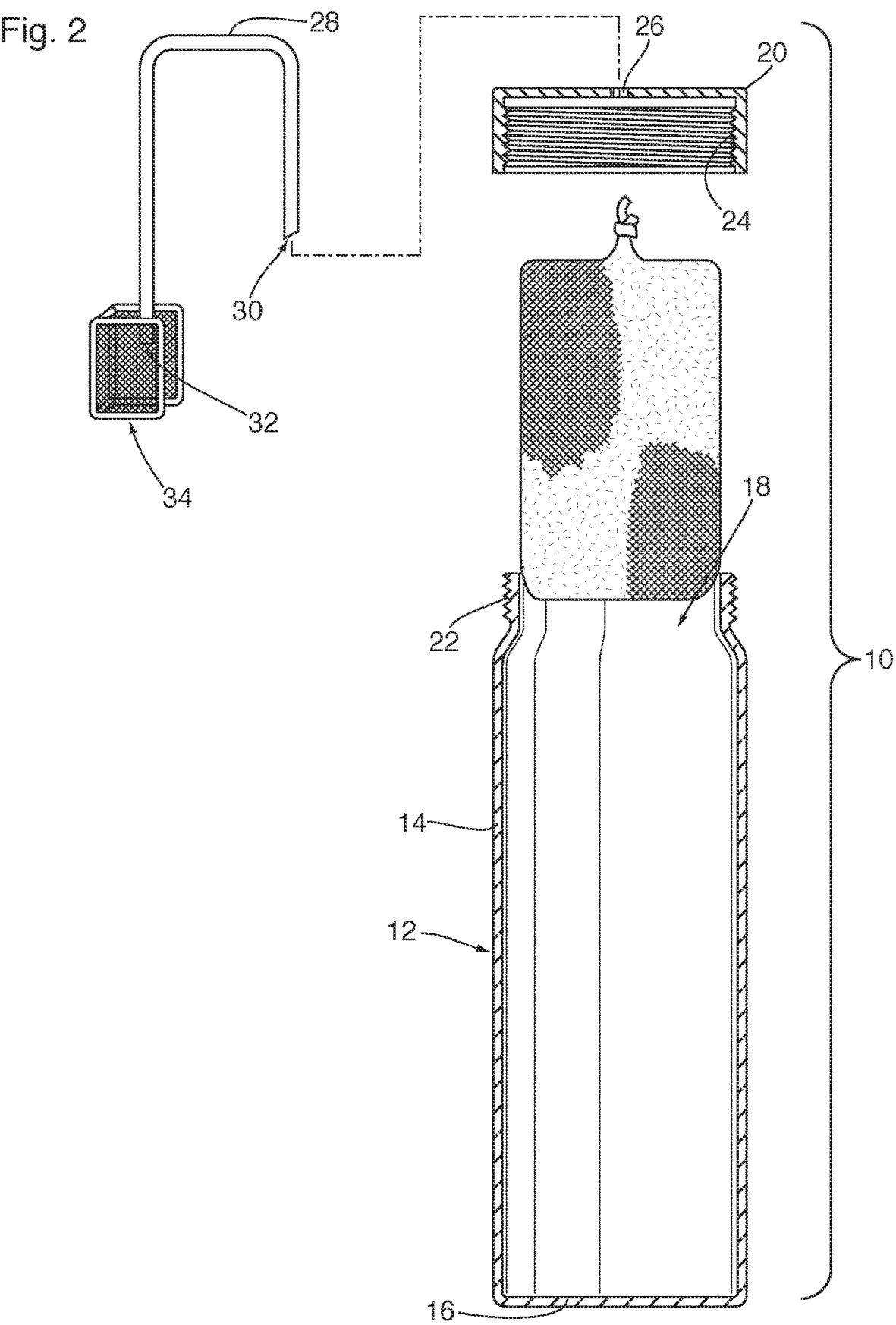
FIG. 2 is an exploded perspective view of the agent dispenser of FIG. 1.

The agent dispenser is generally indicated by the numeral 10 and shown in greater detail in FIG. 1. The agent dispenser 10 is constructed of a material having a coefficient of cubical expansion that differs from the coefficient of cubical expansion of the water. The coefficient of cubical expansion may be defined as the increment of volume of a unit volume for a rise of temperature of one degree. In the present example, it is preferred that there be a significant difference in the coefficients; preferably by a magnitude of ten. Preferably, the material of the agent dispenser is a suitable glass or crystalline polymer such as crystalline polystyrene. The coefficient of cubical expansion of crystalline polystyrene is approximately one-tenth of the coefficient, of cubical expansion of water. Consequently, it has been found that a dispenser constructed of crystalline polystyrene is suitable for use when the liquid is water. The coefficient of cubical expansion of glass differs from that of water by even a greater amount. The dispenser 10 may be constructed in any shape that is desired. In the present example, a cylindrically shaped dispenser is illustrated. The dispenser 10 as shown in FIG. 1 comprises a hollow casing 12 having a wall 14 and a bottom 16. The container has an open top 18. In a preferred embodiment, the hollow casing 12 is made of glass. The open top 18 may be closed by a suitable fastening means such as a cap 20 as described below The cap 20 may be removably attached in different ways to the open top 18 of the dispenser 10. In the embodiment shown in FIG. 1, the dispenser 10 is provided with a threaded arrangement 22 on the exterior of the wall 14 adjacent the open top 18, which cooperates with a corresponding threaded arrangement 24 on the interior of the wall of the cap 20. In this way, when the agent within the dispenser 10 is exhausted, the cap 20 may simply be removed and a fresh supply of the agent placed therein, after which the cap 20 may be closed once more.

The cap 20 may alternatively be permanently sealed to the hollow casing to prevent reuse. Such dispensers would be replaceable, as sealed units, when exhausted.

Generally at its centre the closure cap 20 is provided with a generally circular opening 26. The size of the opening 26 directly affects the rate of flow of fluid into and out of the dispenser 10. Consequently, in cases where the agent requires a longer time to evaporate or dissolve into the fluid contained within the dispenser 10, it may be necessary to make the opening 26 smaller. This will ensure that most of the fluid remains within the dispenser 10 for an extended time, and thus becomes saturated with the agent. On the other hand, in cases where the agent evaporates or dissolves quickly into the fluid, it may be desirable to make the opening 26 larger, or provide more than one opening for the dispenser 10. This will permit the treated fluid to be resident in the treatment chamber for a shorter period of time.

The cap 20 is provided with a tube 28 which is preferably permanently sealed to the cap 20. One end 30 of the tube 28 is contained within the hollow casing 12 and the second end 32 of the tube 28 is exterior to the hollow casing 12 for communication with the surrounding fluid.

The second end 32 of the tube 28 is provided with a filter membrane 34 to prevent any debris which may be present in the surrounding fluid from blocking the second end 32 or entering the hollow casing 12. It has been determined from experiments, that the optimum pore size of the membrane 34 is between about 1 μM and about 5 μM, preferably about 1 μM. It has been found that if the pore size is 10 μM or greater, there is a tendency for the debris to block the pores. If the pore diameter is below 1 μM, the flow of the fluid into and out of the agent dispenser 10 is affected.

It has been found that the best performance is achieved when the filter membrane 34 at the second end is provided as a bag or filter structure larger than the size of the opening of the second end. In order to properly support the membrane filter 34 at the second end, it is preferred if a support structure such as a cage 36 is provided to physically support the membrane filter 34. In this way, the membrane filter 34 does not collapse and expand based upon the flow of the fluid in or out of the agent dispenser 10.

The agent 38 is placed within the dispenser 10 for dispensing the agent into the fluid contained within the dispenser 10 and the cap 20 is repositioned thereon. The agent may be in any desired form, as long as it is capable of mixing with the fluid that is being treated. If desired, other materials such as carriers and materials which affect the miscibility of the agent in the fluid can be admixed with the agent. Presently, the preferred use of the dispenser 10 is for treating water with iodine. For this particular application an agent consisting of solid iodine crystals is suitable.

Generally, the dispenser 10 will be initially charged with iodine crystals in such an amount that the crystals are disposed entirely below the one end 30 of the tube 28, when the dispenser 10 is lying on its side. In order to improve the performance of the dispenser 10, it is preferred that the agent 38 be contained with a bag of a membrane material 40. Similar to the membrane material of the membrane filter 34, it is preferred that the membrane material of the bag have a pore size of between about 1 μM and about 5 μM, preferably about 1 μM.

Method for Treating Water with Iodine

Figure 3:
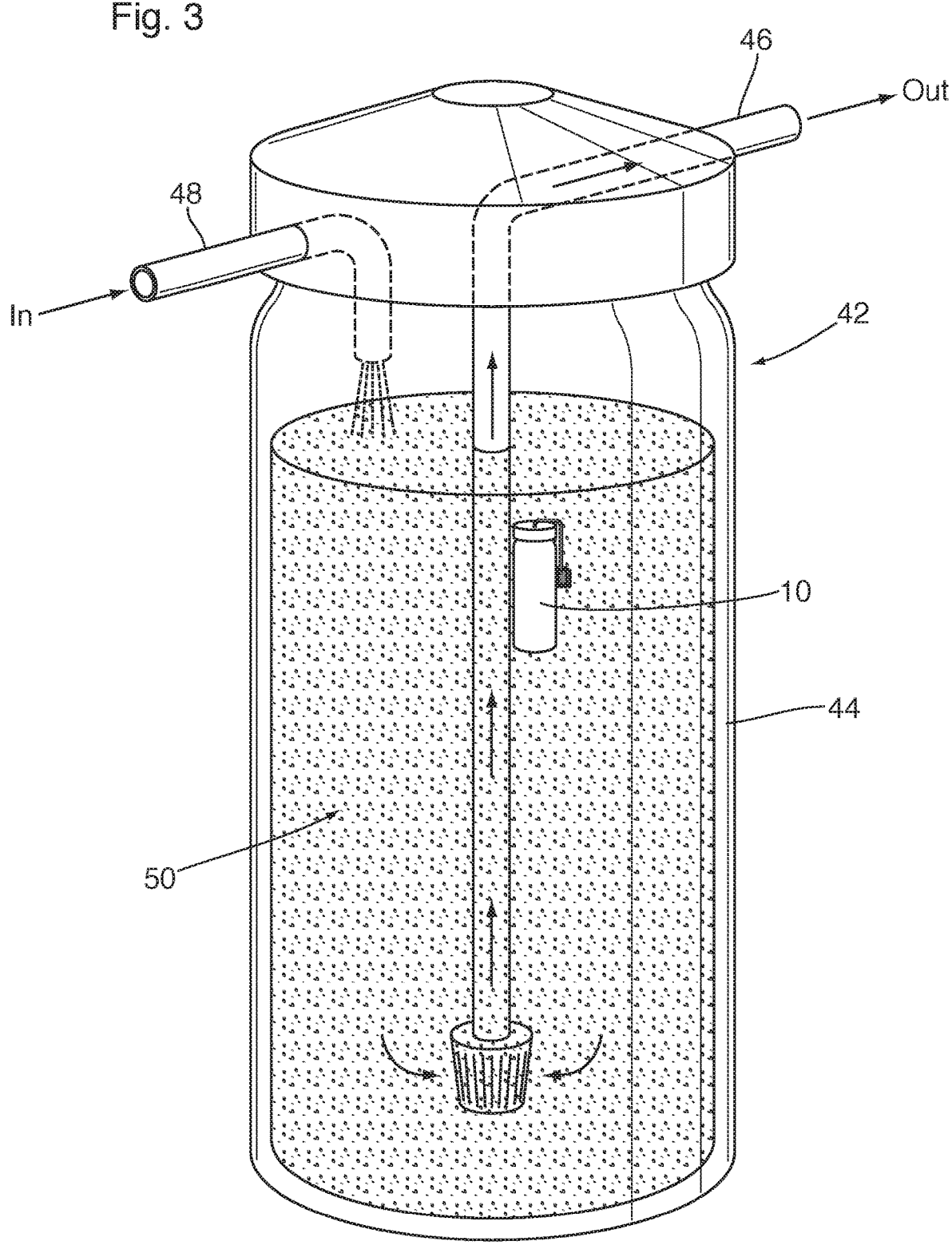
FIG. 3 is a sectional elevation of an apparatus for treating a domestic water supply in accordance with the present invention utilizing the agent dispenser of FIG. 1.

A preferred embodiment of an apparatus for treating water using the preferred embodiment of the agent dispenser 10 of the present invention is depicted in FIG. 3 in the form of an in-line water filter 42. The apparatus 42 includes a reservoir 44 from which filtered water may be discharged through outlet means 46 at its upper end. The reservoir 44 comprises a treatment chamber. Water may be introduced into the reservoir treatment chamber 44 through inlet means 48. The reservoir treatment chamber 44 is provided with a filter element containing a suitable filter material such as granular activated carbon indicated at 50.

In the embodiment of the treatment chamber 44 illustrated in FIG. 3, has the agent dispenser contained within the filter material 50. It is possible to provide this arrangement because of the presence of the membrane filter 34 of the agent dispenser 10. However, as described in my previous patent, U.S. Pat. No. 5,525,223, the disclosure of which is incorporated herein by reference, other arrangements of the treatment chamber are possible.

The agent dispenser 10, when submersed in the fluid present in the treatment chamber 44, will fill with some of the fluid. Thus, when treating water with iodine, the dispenser 10 containing iodine crystals will also become filled with water. The water contained within the dispenser 10 will eventually become saturated with dissolved iodine. The iodine-saturated water contained within the dispenser 10 is referred to hereafter as treated contents.

Considering the situation when no new water has flowed through the inlet tube 48 for some time, the dispenser 10, and its treated contents, will be in thermal equilibrium with the water in the treatment chamber 44. In other words, the dispenser 10 and treated contents 52 will be at the same resting temperature as the water surrounding the dispenser.

If a valve or faucet (not shown) is now operated to permit the flow of water through the inlet tube 48, and assuming such incoming water is at a lower temperature than the resting temperature of the water in the treatment chamber 44, as is usually the case, then the dispenser 10 will immediately be surrounded by cooler water and will no longer be in thermal equilibrium therewith.

Heat will flow from the dispenser 10, and from its treated contents, to the cooler surrounding water causing the temperature of the dispenser 10 and its treated contents to fall. As the temperature falls, the treated contents of the dispenser 10 will contract. (In fact, the dispenser itself will contract as it cools, however, in the case of a crystalline polystyrene dispenser, the rate of contraction is negligible compared to the rate of contraction of the treated contents.) The contraction of the treated contents will cause an induction of water from the treatment chamber 44 through the tube 28 into the dispenser 10. The additional water drawn into the dispenser 10 will soon become saturated with dissolved iodine.

When the valve or faucet is disengaged and the water stops flowing through the inlet tube 48, the water in the treatment chamber 44 as well as the dispenser 10 and its treated contents, will gradually return to the resting temperature. In the present example, the treated contents would gradually increase in temperature until they reach the resting temperature and are once again in thermal equilibrium. As the treated contents of the dispenser 10 return to the resting temperature, they will expand. (Again, the dispenser 10 may itself also expand, but at a much lower, almost negligible rate). Consequently, some of the treated contents will be expelled from the dispenser 10 into the treatment chamber 44. Through the process of diffusion, the expelled iodine-saturated water will mix with the remainder of the water contained within the treatment chamber 44, including the fresh, untreated water recently added to the system.

In this way each new supply of water to the treatment chamber 44 may become treated with iodine.

It should be understood that the process will work, in the reverse order, when the temperature of the water supply through the inlet tube 48 is warmer than the resting temperature in the treatment chamber 44. Also, the process will work in the reverse order when the coefficient of cubical expansion of the fluid is less than the coefficient of cubical expansion of the dispenser material.

The amount of iodine ultimately introduced into the surrounding water in the treatment chamber 44 will depend upon the volume of the dispenser 10, the temperature range between the resting temperature and the temperature of the incoming supply, the coefficient of cubical expansion of the material from which the dispenser 10 is constructed and to some extent the size of the dispenser opening 26.

In the apparatus as depicted in FIG. 3, the treatment chamber 44 is part of the reservoir for the treated water. It may be appreciated that, for larger water supplies such as may exist in commercial buildings and the like, it may be desirable to provide the two components separately. This is described in my previous patent, U.S. Pat. No. 5,525,223, the disclosure of which is incorporated herein, wherein the reservoir and filter element are illustrated and the treatment chamber is illustrated as separate elements. Flow means are provided to permit the flow of treated water from the treatment chamber to the reservoir. One advantage in separating the treatment chamber from the reservoir is the increased efficiency given to the agent dispenser. The treatment chamber would have a much smaller volume than the reservoir. Consequently, when cold (or hot) water is added to the chamber, the overall temperature in the chamber will drop (or rise) faster and to a greater extent than it would if the chamber was incorporated in the much larger volume reservoir. Such an arrangement has proven effective in treating a reservoir holding approximately 280,000 gallons (approximately 1,260,000 liters) of water with a small treatment chamber containing a cylindrical dispenser having a length of 3 feet (approximately 0.93 meters), radius of 1 foot (approximately 0.31 meters) and an opening of 0.25 inches (approximately 64 millimeters).

As has also been described in my previous patent, U.S. Pat. No. 5,525,223, the disclosure of which is incorporated herein, a further embodiment of the invention for water filter treatment may be in the form of a domestic countertop device for use in a kitchen, bathroom, or office. In this case, it is assumed that the location will have a conventional domestic faucet. It is also assumed that such faucet will be generally surrounded by a countertop, or other form of stand or work surface. The device is intended to be a portable free-standing device that is located beside the faucet. It has been found that a dispenser having a generally cylindrical shape, with a length of 3 inches (approximately 762 millimeters), a radius of 1.25 inches (approximately 318 millimeters) and an opening of 0.125 inches (approximately 32 millimeters) is suitable for treating a reservoir of 4 gallons (approximately 18 liters) containing a filter element.

In this way, the countertop unit provides a self-contained portable water filter incorporating its own treatment chamber and agent dispenser. It may be stored on the kitchen countertop and used from time to time when it is desired to draw off a jug of clean drinking water. The filter element removes impurities existing in the water while the agent dispenser introduces a quantity of iodine into the water to prevent the growth of bacteria on the filter.

As also described in my pervious patent, U.S. Pat. No. 5,525,223, the disclosure of which is incorporated herein by reference, the invention may also be embodied in a personally portable device for use by travellers, office workers and the like who may have reason to be concerned about the quality of the water they may be drinking as they move from place to place. The apparatus would preferably comprises a compact, generally rectangular case, defining three generally cylindrical parallel spaced apart interconnected reservoirs. In this way, the three chambers are essentially connected end-to-end, in a compact, easily portable configuration. Filter elements are located in each reservoir. The filter elements contain a suitable filter material such as granular activated carbon.

Space is provided adjacent the first reservoir for a treatment chamber. An inlet means connects to the end of the chamber, remote from junction to the next reservoir. The inlet means may be provided with a bulb or other form of manual pumping device. An outlet means is connected to the end of the last reservoir.

An agent dispenser is located in the treatment chamber adjacent the inlet means. An agent consisting of solid iodine crystals is suitable for this application. For convenience, securement clips may be provided for securing hoses on either side of the case.

Using this configuration, the device may be small enough to fit easily in hand luggage, and yet provide an extended filter path that is treated with iodine saturated water. It is intended that such a device be disposable after a reasonable working life.

The iodine treatment method and apparatus described above is but one conceivable application for the invention.

Many other uses are contemplated including agricultural applications involving the introduction of vitamins, minerals and other nutrients to both livestock and crop water supplies. In such applications, the agent dispenser may be placed into the fluid being treated. For example, an agent dispenser containing vitamin and mineral agents may be placed within a livestock water trough. Every time the trough is refilled a quantity of water, the agent will be ejected into the potable water supply.

It is to be understood that what has been described are preferred embodiments of the invention. The invention nonetheless is susceptible to certain changes and alternative embodiments as understood by those of ordinary skill in the art based upon the invention as described above and the scope of the claims set out below.

The embodiments of the invention in which an exclusive property or privilege is claimed are defined as follows:

1. An apparatus for introducing an agent into a fluid at a controlled rate, where the agent is miscible with such fluid, said apparatus comprising:
    (a) a reservoir for storing said fluid;
    (b) an inlet for supplying said fluid to said reservoir;
    (c) an outlet for discharging said fluid from said reservoir;
    (d) a filter element containing granular activated carbon located in said reservoir adjacent to said outlet; and
    (e) at least one agent dispenser located within said reservoir adjacent to said inlet and surrounded by said fluid, said at least one agent dispenser containing said agent, and said at least one agent dispenser being constructed of a hollow casing having a co-efficient of cubical expansion that differs from a co-efficient of cubical expansion of said fluid, said at least one agent dispenser having at least one opening for permitting flow of said fluid between said hollow casing and said reservoir, the at least one opening being provided with a tube sealed in the at least one opening, one end of the tube being contained within the hollow casing and a second end of the tube being exterior to the hollow casing for communication with the fluid surrounding said at least one agent dispenser, the second end of the tube being provided with a filter membrane having a defined pore size to prevent any debris which may be present in the fluid surrounding said at least one agent dispenser from blocking the second end or entering the hollow casing; said filter membrane having a surface area larger than a diameter of the second end of said tube;
    wherein said agent is introduced into said fluid surrounding said at least one agent dispenser through said fluid surrounding said at least one agent dispenser being drawn into and expelled from said at least one agent dispenser through the filter membrane and said tube due to variations in an internal pressure of said at least one agent dispenser resulting from thermal expansion and contraction of the at least one agent dispenser and said agent due to variations in temperature of said fluid surrounding said at least one agent dispenser.

2. An apparatus as claimed in claim 1 wherein said agent is at least one vitamin or mineral.

3. An apparatus as claimed in claim 1 wherein said agent is iodine and said fluid is water.

4. An apparatus as claimed in claim 3 wherein said hollow casing comprises:
    (a) a generally cylindrical body having walls, a bottom and an open top;
    (b) a member for closing said open top, having the at least one opening for the tube therein; and
    (c) a fastening arrangement for fastening said member to close said open top.

5. An apparatus as claimed in claim 4 wherein said filter membrane has the defined pore size of between about 1 µM and about 5 µM.

6. An apparatus as claimed in claim 5 wherein said filter membrane has the defined pore size of about 1 µM.

7. An apparatus as claimed in claim 6 wherein the filter membrane is larger than the diameter of the second end of the tube.

8. An apparatus as claimed in claim 7 wherein the filter membrane is supported by a support structure to physically support the filter membrane surrounding the second end of the tube to prevent a collapse and expansion of the filter membrane based upon the flow of the fluid in or out of the at least one agent dispenser.

9. An agent dispenser for introducing an agent into a fluid at a controlled rate, where the agent is miscible with such fluid, said agent dispenser containing said agent, and said agent dispenser comprising a hollow casing having a co-efficient of cubical expansion that differs from a co-efficient of cubical expansion of said fluid, said agent dispenser having at least one opening for permitting flow of said fluid into and out of said hollow casing, the at least one opening being provided with a tube sealed in the at least one opening, one end of the tube being contained within the hollow casing and a second end of the tube being exterior to the hollow casing for communication with the fluid surrounding said agent dispenser, the second end of the tube being provided with a filter membrane having a defined pore size to prevent any debris which may be present in the fluid from blocking the second end or entering the hollow casing; said filter membrane having a surface area larger than a diameter of the second end of said tube;
    wherein said agent is introduced into said fluid surrounding said agent dispenser through said fluid surrounding said agent dispenser being drawn into and expelled from said agent dispenser through said filter membrane and said tube due to variations in an internal pressure of said agent dispenser resulting from thermal expansion and contraction of the agent dispenser and said agent due to variations in temperature of said fluid surrounding said agent dispenser.

10. An agent dispenser as claimed in claim 9 wherein said agent is at least one vitamin or mineral.

11. An agent dispenser as claimed in claim 9 wherein said agent is iodine and said fluid is water.

12. An agent dispenser as claimed in claim 11 wherein said hollow casing comprises:
    (a) a generally cylindrical body having walls, a bottom and an open top;
    (b) a member for closing said open top, having the at least one opening for the tube therein; and
    (c) a fastening arrangement for fastening said member to close said open top.

13. An agent dispenser as claimed in claim 12 wherein said filter membrane has the defined pore size of between about 1 µM and about 5 µM.

14. An agent dispenser as claimed in claim 13 wherein said filter membrane has the defined pore size of about 1 µM.

15. An agent dispenser as claimed in claim 14 wherein the filter membrane is larger than the diameter of the second end of the tube.

16. An agent dispenser as claimed in claim 15 wherein the filter membrane is supported by a support structure to physically support the filter membrane surrounding the second end of the tube to prevent a collapse and expansion of the filter membrane based upon the flow of the fluid in or out of the agent dispenser.

\* \* \* \* \*